United States Patent [19]
Geisthoff

[11] Patent Number: 4,799,817
[45] Date of Patent: Jan. 24, 1989

[54] DOUBLE HOOKES JOINT

[75] Inventor: Hubert Geisthoff, Lohmar, Fed. Rep. of Germany

[73] Assignee: Jean Walterscheid GmbH, Fed. Rep. of Germany

[21] Appl. No.: 108,715

[22] Filed: Oct. 14, 1987

[30] Foreign Application Priority Data

Oct. 24, 1986 [DE] Fed. Rep. of Germany ....... 3636194

[51] Int. Cl.⁴ ................................................ F16D 3/00
[52] U.S. Cl. ......................................... 403/57; 464/139
[58] Field of Search ........................... 403/57, 52, 58; 464/113, 139, 140, 142

[56] References Cited

U.S. PATENT DOCUMENTS 2,427,237  9/1947  Suczek ................................. 464/139
2,485,893 10/1949  Kost ................................. 464/139 X
4,582,503  4/1986  Sherman ................................ 464/139

FOREIGN PATENT DOCUMENTS 1302735 12/1966 Fed. Rep. of Germany .
2012918  8/1979 United Kingdom .

Primary Examiner—James T. McCall
Attorney, Agent, or Firm—Toren, McGeady & Associates

[57] ABSTRACT

A wide angle double Hookes joint comprises a double inner yoke 2a, 2b; two outer yokes 3 which are each pivotally connected to the inner yoke by a respective cross member 4, each cross member comprising a first pair of trunnions received in bearings in yoke arms of the outer yoke and a second pair of trunnions received in bearings in yoke arms of the inner yoke; a guide member 9 having bearing means 8 engaging said outer yokes to guide them to provide homokinetic torque transmission, said guide member 9 being mounted in the inner yoke for radial movement relative to the axis of rotation thereof; a pair of guide plates 10 in the inner yoke between which said guide member 9 is radially movable with said bearing means 8 engaged within identical radially extending slots 17 in said guide plates, and said guide plates being rotatable about the axis of rotation of the inner yoke.

10 Claims, 4 Drawing Sheets

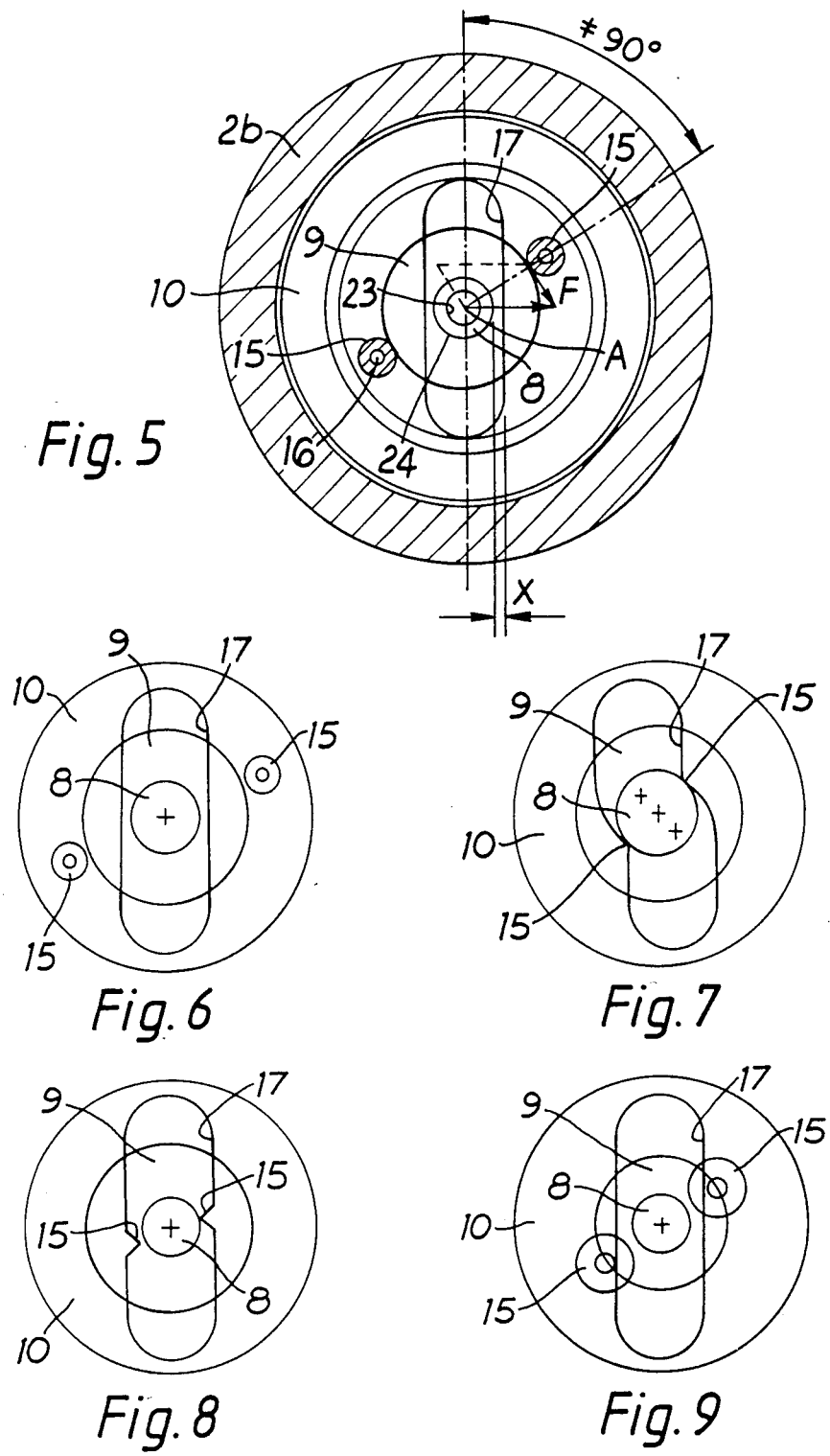

DOUBLE HOOKES JOINT

BACKGROUND TO THE INVENTION

1. FIELD OF THE INVENTION

This invention relates to a universal joint suitable for transmitting torque through a large angle and which, particularly but not exclusively, is suitable for use in the transmission between the power take off shaft of an agricultural tractor and the drive shaft of an agricultural implement. The universal joint of the present invention is of the type comprising a double Hookes joint which comprises a double inner yoke and two outer yokes which are each pivotally connected to the inner yoke by a respective cross member, each cross member comprising a first pair of trunnions in bearings in yoke arms of the outer yoke and a second pair of trunnions in bearings in yoke arms of the inner yoke, and guide means in the inner yoke having bearing means engaging the outer yokes to guide them to provide homokinetic torque transmission.

2. DESCRIPTION OF THE PRIOR ART

A double Hookes joint of the above type is described in DE-A-No. 13 02 735 wherein the guide means comprises a circular disc mounted in the inner yoke for radial sliding movement relative to the axis of rotation thereof. The outer yokes are engaged with the disc by means of a ball headed extension on each outer yoke cooperating with a respective cylindrical bearing guide extending perpendicularly and centrally from each side of the disc. The outer yokes are guided in a plane which bisects the angle formed by the rotational axes of the shafts upon which the yokes are mounted. In a double Hookes joint constructed as described in this patent specification, it is only possible to achieve an articulation of 90 degrees in that plane in which the axes of the cross member trunnion bearings of the two outer yokes are located. It is not possible to achieve an articulation of 90 degrees in the perpendicular plane since the angle is limited by the permissible range of traverse of the outer yokes.

In order to increase the articulation of the joint it has been proposed in GB-A No. 2 012 918 to provide a double Hookes joint wherein the cross members are asymmetric, the distance between the arms of each yoke of the double inner yoke radial to its rotational axis being greater than the distance between the arms of each outer yoke radial to its respective rotational axis. In such a arrangement, it is possible to increase the articulation angle in all planes but, at the same time, the space required for articulation purposes is increased and the diameter of the inner yoke is increased. Such a greater diameter of the inner yoke results in an increase in weight of the rotating mass and, generally, a welded connection is provided between the two halves of the inner yoke. With such a welded connection, the inner assembly comprising the disc and bearing guides cannot be removed so that, in the event of damage, the entire double inner yoke has to be replaced.

However, the principle disadvantage of this construction is in the increase in weight of the rotating mass since, in a double Hookes joint, the two individual joints thereof themselves rotate irregularly with alternating accelerative and decelerative effects.

SUMMARY OF THE INVENTION

It is an object of the present invention to provide a wide angle double Hookes joint which will offer advantages in terms of both space and weight in comparison with the known double Hookes joints described above.

In accordance with the invention there is provided a wide angle double Hookes joint comprising a double inner yoke; two outer yokes which are each pivotally connected to the inner yoke by a respective cross member, each cross member comprising a first pair of trunnions received in bearings in yoke arms of the outer yoke and a second pair of trunnions received in bearings in yoke arms of the inner yoke; a guide member having bearing means engaging said outer yokes to guide them to provide homokinetic torque transmission, said guide member being mounted in the inner yoke for radial movement relative to the axis of rotation thereof; a pair of guide plates in the inner yoke between which said guide member is radially movable with said bearing means engaged within identical radially extending slots in said guide plates, and said guide plates being rotatable about the axis of rotation of the inner yoke.

It is preferred that the guide member is of circular disc like form with stop means provided on the guide plates for abutment by the edge of the guide member whereby, upon abutment by said guide member, a force causing rotary movement of the guide plates is imparted thereto. The stop means are preferably provided on the guide plates adjacent or within the boundaries of said radially extending slots.

Conveniently said stop means are provided by spacers extending axially between the guide plates connecting them together and maintaining the said radially extending slots in alignment with one another. The stop means may each comprise a pin having an elastomeric element thereon or a roller bearing.

The stop means preferably comprises two stops on a line extending at an angle to the longitudinal axis of said slots which angle is not equal to a right angle, the bearing means being movable with a clearance within said slots and the minimum movement of said bearing means within said clearance being greater than the difference between the radius of the guide member and the radial distance between the radially innermost point of each stop and the axis of rotation of the inner yoke.

Preferably bearing elements are provided supporting said guide plates for rotary movement in the inner yoke.

BRIEF DESCRIPTION OF THE DRAWINGS

Other features of the invention will become apparent from the following description given herein solely by way example with reference to the accompanying drawings wherein

FIG. 5 is a sectional view on the line A–B of FIG. 3;

FIGS. 6 to 9 are diagrammatic views of alternative embodiments of the guide plates and stop means.

DESCRIPTION OF THE PREFERRED EMBODIMENTS

Figure 1:
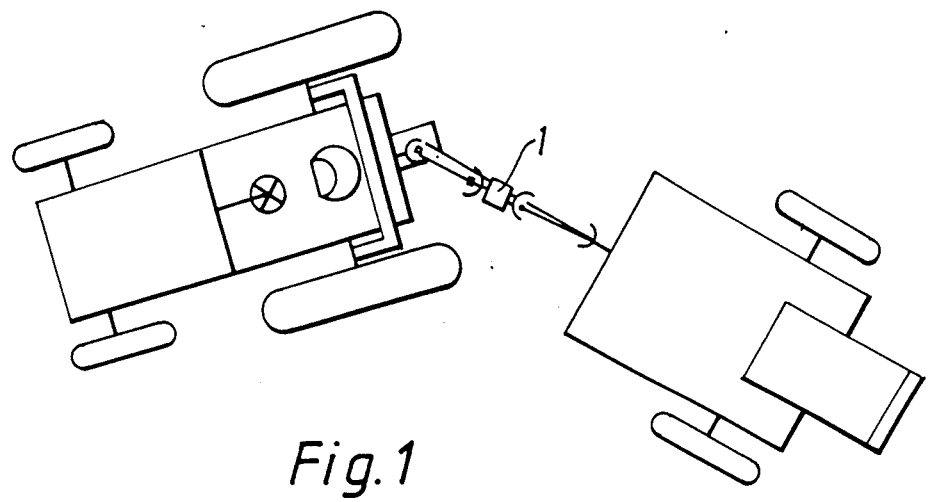
FIG. 1 is a diagrammatic plan view of an agricultural tractor towing an agricultural implement and including a wide angle double Hookes joint in the transmission line between the tractor and the implement.
Figure 2:
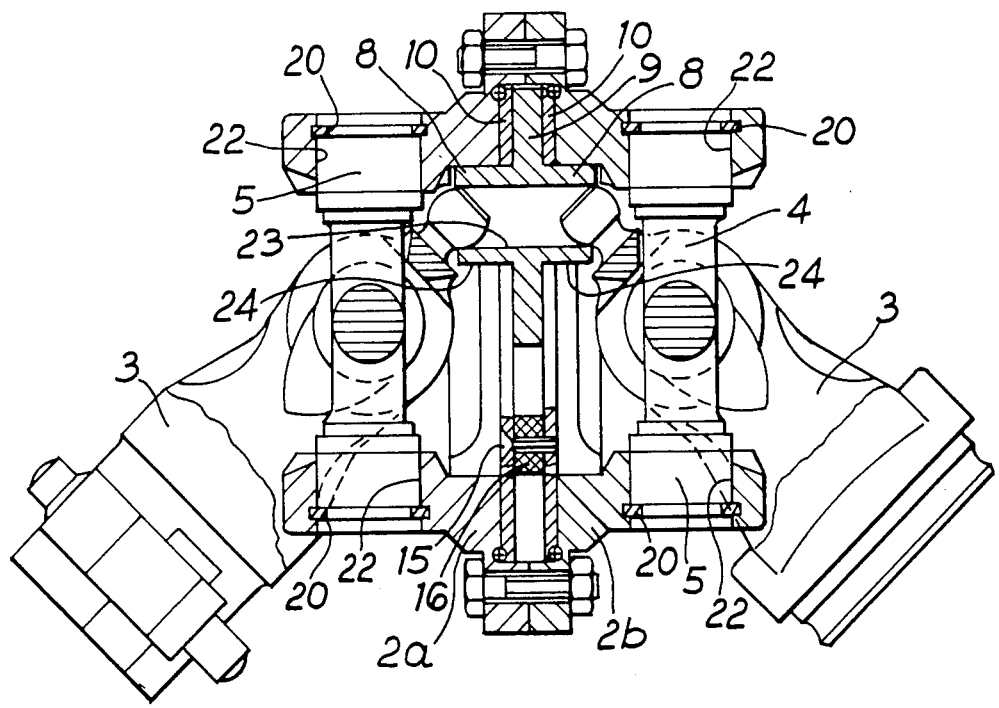
FIG. 2 is a cross sectional view of a wide angle double Hookes joint in accordance with the invention undergoing a 90 degree articulation in one plane only.

In FIG. 1 of the drawings there is shown a diagrammatic representation of one application of a wide angle double Hookes joint constructed in accordance with the invention. There is shown an agricultural tractor towing an agricultural implement which is driven from the power take off shaft of the tractor through a multi-part drive line which includes the wide angle double Hookes joint 1.

The wide angle double Hookes joint of the invention is illustrated in more detail in FIGS. 2 to 5 and comprises a double inner yoke formed in two parts 2a and 2b of circular form connected together at their peripheries to define an internal cylindrical space 11 for the reception of a guide member 9 and guide plates 10 as will be described in more detail below. Two outer yokes 3, each mountable on the end of a drive shaft (not shown), are each pivotally connected to the inner yoke by a respective cross member 4 with each cross member comprising a first pair of trunnions in bearings 5 in bores 13 in the yoke arms 12 of the outer yoke 3 and a second pair of trunnions in bearings 5 in bores 22 in the yoke arms of the inner yoke. The bearings 5 are retained by circlips 20 or the like in known manner, the first and second pair of trunnions comprising each cross member 4 are arranged perpendicular to one another and the trunnions are preferably of equal length.

The axially outer ends of the outer yoke arms 12 are each connected by bridge pieces 6 each carrying a ball journal 7 extending axially outwardly of the ends of the yoke arms 12.

As mentioned above, within the cylindrical space 11 defined between the two halves 2a and 2b of the inner yoke there is provided the guide member 9 and guide plates 10. The guide member 9 comprises a circular disc like member having bearing means 8 projecting centrally and perpendicularly from each face thereof in the form of a cylindrical guide tube having an internal bore 23 within each end of which is engaged one of the ball journals 7 of each outer yoke 3. On either side of the disc 9 there is provided an annular guide plate 10 each of which has an identical radially extending slot 17. The two guide plates 10 are connected together by spacers each comprising stop means 15 in the form of a pin secured axially between the guide plates 10 and carrying either an elastomeric member 16 in the form of a rubber bush or a roller bearing in the space between the inner faces of the guide plates 10. The spacers 15, 16 maintain the two guide plates 10 with their radially extending slots 17 in alignment with one another and the cylindrical bearing guide 8 of the guide member 9 is engaged at each end within a respective slot 17 so as to be movable within such slot. As shown in more detail in FIG. 4, each guide plate 10 is mounted within the space 11 between the two halves 2a and 2b of the inner yoke for rotation on bearings 14 about the axis of rotation of the inner yoke.

Referring to FIG. 5, it will be seen that the two spacers 15, 16 are positioned on a line extending at an angle to the longitudinal axis of the slots 17 which angle is not equal to a right angle. Also from FIG. 5 it will be seen that there is a minimum clearance X between the outer surface 24 of the bearing guide 8 and the adjacent wall of a slot 17 which is such as to ensure that the edge of the disc 9 will abut the spacers 15, 16 before the outer surface 24 of the bearing guide 8 contacts the adjacent wall of a slot 17. This arrangement ensures that if, during articulation of the outer yokes relative to the inner yoke, the outer surface 24 of the guide member 9 abuts against the spacers 15, 16, then a force F is imparted to the guide plates 10 causing rotary movement thereof. This arrangement permits of a construction of disc 9 with a relatively small diameter having a relatively large degree of radial sliding movement between the guide plates 10 within the limits defined by the length of the slots 17.

Figure 3:
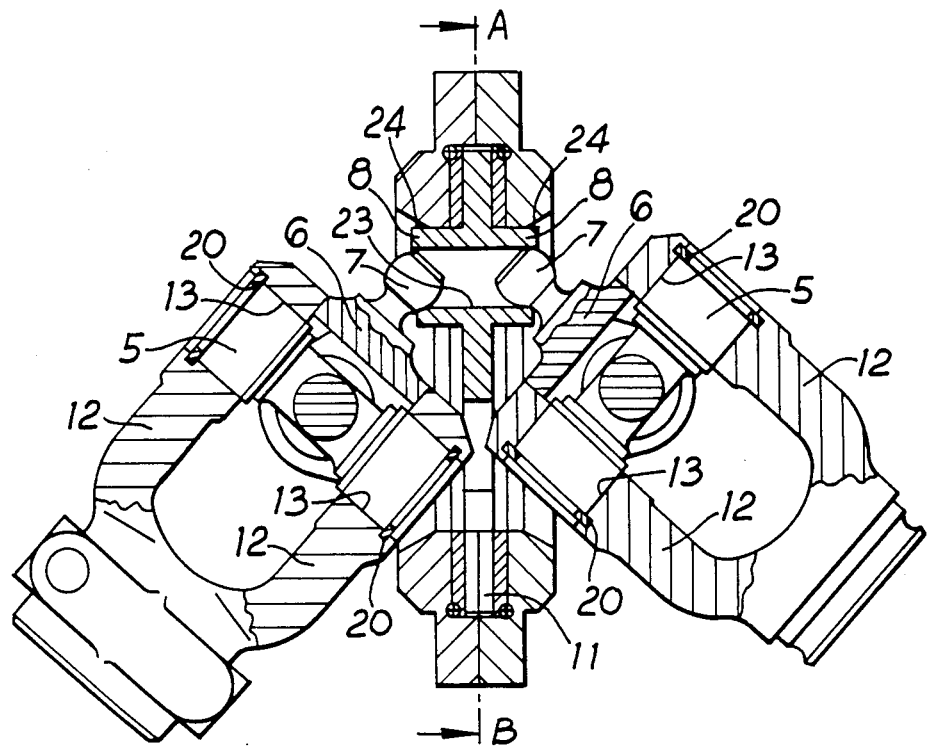
FIG. 3 is a cross sectional view of the joint of FIG. 2 showing a 90 degree articulation in a plane perpendicular to that shown in FIG. 2.

The construction of double Hookes joint in accordance with the invention, when compared with the construction shown in GB-A No. 2 012 918, means that the axial dimension of the inner yoke is greater but there is no disadvantage attached to this fact in that the actual degree of articulation of the joint of the invention is actually greater than that of the prior art joints. Thus, referring to FIG. 3, it will be seen that even a 90 degree angle of articulation is permitted in the plane shown as the ends of the outer yoke arms 12 are able to enter within the slots 17. It will be appreciated that the arrangement of the guide member 9 with respect to the slots 17 in the rotatable guide plates 10 means that an alignment as shown in FIG. 3 is always obtainable i.e. it will always be possible for the ends of the outer yoke arms 12 to enter the slots 17 upon articulation from which it will be seen that the increased thickness of the inner yoke due to the provision of the guide plates does not have any adverse effect.

Figure 4:
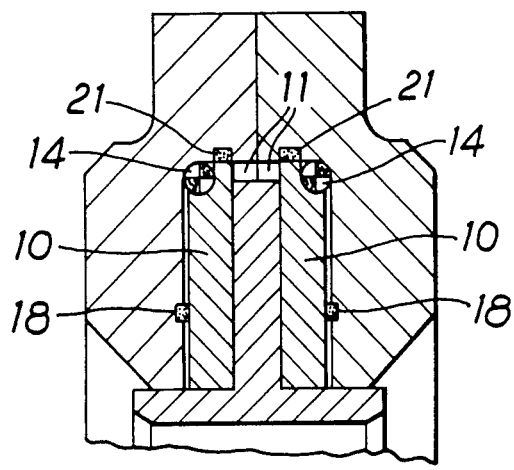
FIG. 4 is an enlarged cross sectional view of a part of the guide member and the guide plates in the inner yoke.

As mentioned above, the guide plates 10 are arranged for rotation about the axis of rotation of the inner yoke on bearings 14 which conveniently are roller bearings. As shown in FIG. 4, both the axially outer faces and the edges of the guide plates 10 cooperate with respective seals 18 and 21 to prevent loss of lubricant and the ingress of contaminants.

The two halves 2a and 2b of the inner yoke may either be bolted together or welded together at their peripheries although a bolted connection is to be preferred to enable access for service and/or replacement of any of the parts contained within the cylindrical space 11 between the two yoke halves.

In FIGS. 6 to 9 of the drawings there are shown various alternative embodiments of guide plates 10 and stop means 15. In FIG. 6 there is shown a diagrammatic representation of the guide plates 10, their slots 17 and the stop means in the form of spacers 15, 16 as described above with reference to FIGS. 2 to 5. In FIG. 7, the stops 15 are defined by transitional regions between two branches of specially shaped slots 17 although it will be appreciated that such stop means 15 have the same function as the spacers 15, 16 described above with reference to FIGS. 2 to 5 in that, when the outer edge of the guide member 9 abuts the stop means, a force will be imparted to the guide plates 10 causing rotary movement thereof. The same principles of operation are applicable to the other alternative embodiments shown in FIGS. 8 and 9 wherein, in FIG. 8, the stop means 15 are provided as projections within the boundaries of the slot 17 and, in FIG. 9, the stop means 15 are in the form of spacers extending within the boundaries of the slots 17.

Figure 10:
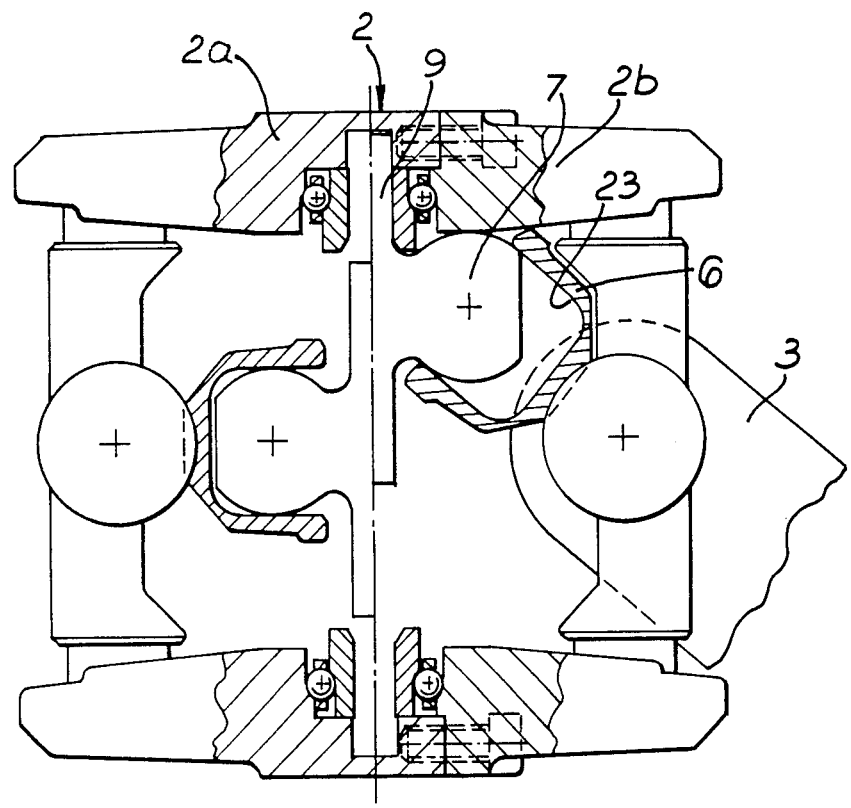
FIG. 10 is a cross sectional view somewhat similar to that of FIG. 2 but showing an alternative embodiment of guide member and outer yokes.

An alternative embodiment of guide member 9 and outer yoke ends is shown in FIG. 10 of the drawings. In this embodiment, the ball journals 7 are provided on opposite sides of the disc 9 and are engaged by respective cylindrical guides 23 each carried on the bridge piece 6 between the outer yoke arms 12. The remaining parts of the inner yoke i.e. the guide plates 10, their slots 17 and bearings 14 may be constructed substantially identically to, and have the same function as, the corresponding parts described above with reference to FIGS. 2 to 5. One advantage of the embodiment of FIG. 10 is that the permissible degree of articulation is further increased because the ball journals 7 have a smaller overall diameter than those described with reference to the embodiment of FIGS. 2 to 5 thus permitting a greater degree of radial movement of the disc 9.

I claim:

1. A wide angle double Hookes joint comprising a double inner yoke; two outer yokes which are each pivotally connected to the inner yoke by a respective cross member, each cross member comprising a first pair of trunnions received in bearings in yoke arms of the outer yoke and a second pair of trunnions received in bearings in yoke arms of the inner yoke; a guide member having bearing means engaging said outer yokes to guide them to provide homokinetic torque transmission, said guide member being mounted in the inner yoke for radial movement relative to the axis of rotation thereof; a pair of guide plates in the inner yoke between which said guide member is radially movable with said bearing means engaged within identical radially extending slots in said guide plates, and said guide plates being rotatable about the axis of rotation of the inner yoke.

2. A double Hookes joint as claimed in claim 1 wherein the guide member is of circular disc like form and stop means are provided on the guide plates for abutment by the edge of the guide member whereby, upon abutment by said guide member, a force causing rotary movement of the guide plates is imparted thereto.

3. A double Hookes joint as claimed in claim 2 wherein said stop means are provided on the guide plates adjacent or within the boundaries of said radially extending slots.

4. A double Hookes joint as claimed in claim 1 wherein said guide plates are connected together by spacers extending axially between said guide plates maintaining said radially extending slots in alignment with one another.

5. A double Hookes joint as claimed in claim 4 wherein the guide member is of circular disc like form and said spacers comprise stop means for abutment by the edge of the guide member whereby, upon abutment by said guide member, a force causing rotary movement of the guide plates is imparted thereto.

6. A double Hookes joint as claimed in any one of claims 2, 3 or 5 wherein said stop means comprises two stops on a line extending at an angle to the longitudinal axis of said slots which angle is not equal to a right angle.

7. A double Hookes joint as claimed in any one of claims 2, 3 or 5 wherein said stops means comprises two stops on a line extending at an angle to the longitudinal axis of said slots which angle is not equal to a right angle and said bearing means are movable with a clearance within said slots, the minimum movement of said bearing means within said clearance being greater than the difference between the radius of the guide member and the radial distance between the radially innermost point of each stop and the axis of rotation of the inner yoke.

8. A double Hookes joint as claimed in any one of claims 2, 3 or 5 wherein each said stops means comprises a pin having an elastomeric element thereon.

9. A double Hookes joint as claimed in any one of claims 2, 3 or 5 wherein each said stops means comprises a pin having a roller bearing thereon.

10. A double Hookes joints as claimed in any one of claims 1, 2 or 4 wherein bearing elements are provided in said inner yoke supporting said guide plate for rotary movement about the axis of rotation of the inner yoke.

* * * * *